United States Patent
Muse et al.

(10) Patent No.: US 11,900,725 B2
(45) Date of Patent: Feb. 13, 2024

(54) AUTHENTICATION AND FACIAL RECOGNITION THROUGH ANALYSIS OF OPTOMETRIC PRESCRIPTION DATA

(71) Applicant: Optum, Inc., Minnetonka, MN (US)

(72) Inventors: Jon Kevin Muse, Thompsons Station, TN (US); Gregory J. Boss, Saginaw, MI (US); Ramprasad Anandam Gaddam, Maharashtra (IN); Hadi D. Halim, Kendall Park, NJ (US)

(73) Assignee: OPTUM, INC., Minnetonka, MN (US)

( * ) Notice: Subject to any disclaimer, the term of this patent is extended or adjusted under 35 U.S.C. 154(b) by 134 days.

(21) Appl. No.: 17/457,393

(22) Filed: Dec. 2, 2021

(65) Prior Publication Data

US 2023/0177876 A1    Jun. 8, 2023

(51) Int. Cl.

| | |
|---|---|
| G06K 9/20 | (2006.01) |
| G06K 9/62 | (2022.01) |
| G06V 40/16 | (2022.01) |
| G06V 10/143 | (2022.01) |
| G06T 5/00 | (2006.01) |
| G06V 10/75 | (2022.01) |

(Continued)

(52) U.S. Cl.
CPC ............ *G06V 40/172* (2022.01); *G06F 21/32* (2013.01); *G06T 5/001* (2013.01); *G06V 10/143* (2022.01); *G06V 10/75* (2022.01); *G06V 10/98* (2022.01); *G06V 40/161* (2022.01); *G06V 40/171* (2022.01); *G06T 2207/30201* (2013.01)

(58) Field of Classification Search
CPC ...... G06V 40/16–40/179; G06V 40/70; G06V 40/171; G01M 11/02–11/04; G02C 13/003
See application file for complete search history.

(56) References Cited

U.S. PATENT DOCUMENTS

| | | | |
|---|---|---|---|
| 5,802,208 A | * | 9/1998 | Podilchuk ............... G06F 18/21 382/253 |
| 7,453,558 B2 | | 11/2008 | Koest |
| 10,036,685 B2 | | 7/2018 | Goldberg et al. |

(Continued)

OTHER PUBLICATIONS

Calistra, "The Effects of Glasses on Facial Recognition," KAIROS, retrieved from https://www.kairos.com/blog/the-effects-of-glasses on-facial-recognition, Feb. 13, 2015, 4 pp.

(Continued)

*Primary Examiner* — Brian Werner
(74) *Attorney, Agent, or Firm* — OPTUM, INC.

(57) ABSTRACT

An example method includes obtaining, by processing circuitry, an image depicting a face of a person wearing eyewear and a reflection pattern generated by projecting light onto a lens of the eyewear and determining, by the processing circuitry, an optical parameter of the lens based on the image. The method further includes receiving, by the processing circuitry and from an electronic database, a personal characteristic data relating to a previously identified person and comparing, by the processing circuitry, the optical parameter of the lens to the personal characteristic data. The method further includes determining, by the processing circuitry and based on the comparison, a score indicative of a match between the person wearing eyewear and the previously identified person.

17 Claims, 6 Drawing Sheets

(51) Int. Cl.
*G06F 21/32* (2013.01)
*G06V 10/98* (2022.01)

(56) References Cited

U.S. PATENT DOCUMENTS

| | | | | |
|---|---|---|---|---|
| 10,039,445 | B1* | 8/2018 | Torch | A61B 5/18 |
| 10,271,042 | B2 | 4/2019 | Rougeaux | |
| 10,373,297 | B2 | 8/2019 | Malaika et al. | |
| 2020/0233202 | A1* | 7/2020 | Derakhshani | G06T 7/586 |
| 2020/0409458 | A1 | 12/2020 | Smithwick et al. | |
| 2022/0101499 | A1* | 3/2022 | Zak | G06T 7/13 |

OTHER PUBLICATIONS

Dahlberg, "Eye Tracking With Eye Glasses," Master's Thesis In Physics at Umea University, Sweden, Jan. 25, 2010, 66 pp.

Marotti, "As the use of facial recognition rises, so do privacy concerns, These Chicago-made glasses are designed to block the technology," The Chicago Tribune, retrieved from https://www.chicagotribune.com/business/ct-biz-facial-recognition-blocking-glasses-privacy-20200417-isy77jwrsncoholhndmyifadr4-story.html, Apr. 17, 2020, 12 pp.

Vincent, "These glasses trick facial recognition software into thinking you're someone else," The Verge, retrieved from https://www.theverge.com/2016/11/3/13507542/facial-recognition-glasses-trick-impersonate-fool, Nov. 3, 2016, 3 pp.

Weaver, "Now you see me, now you don't—Sunglasses and Facial Recognition Technology," Medium. tloveATL-codeWorld, retrieved from https://medium.com/tloveatl-codeworld/now-you-see-me-now-you-dont-sunglasses-and-facial-recognition-technology-4506b9dd8e1c, Aug. 6, 2019, 7 pp.

Zhao et al., "RDCFace: Radial Distortion Correction for Face Recognition," Proceedings of the IEEE/CVF Conference on Computer Vision and Patter Recognition (CVPR), Jun. 13-19, 2020, 10 pp.

"Refractive Index," Wikipedia, The Online Encyclopedia, accessed on Mar. 15, 2022, accessed from https://en.wikipedia.org/wiki/Refractive_index, 23 pp.

* cited by examiner

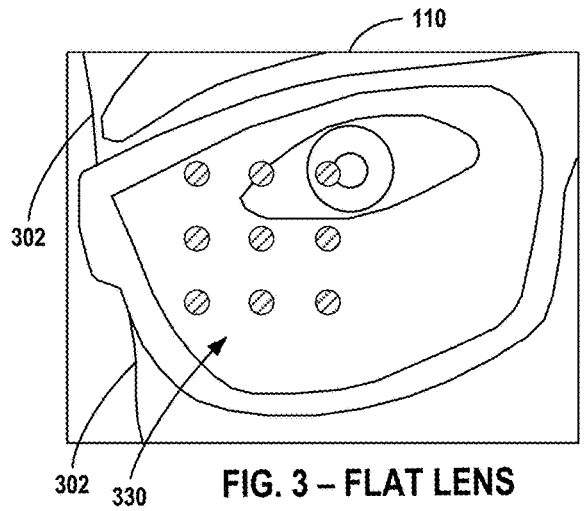
FIG. 3 – FLAT LENS
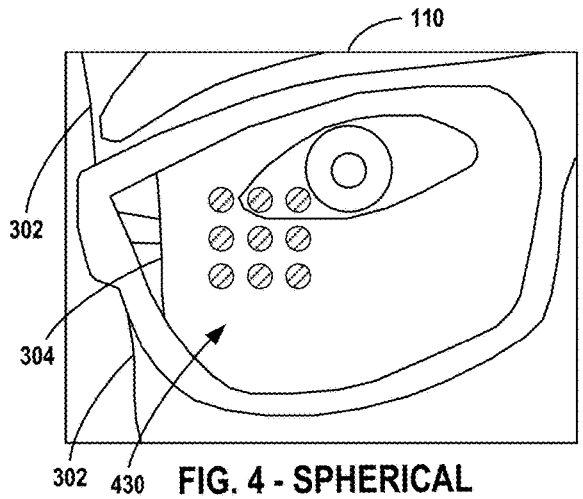
FIG. 4 – SPHERICAL
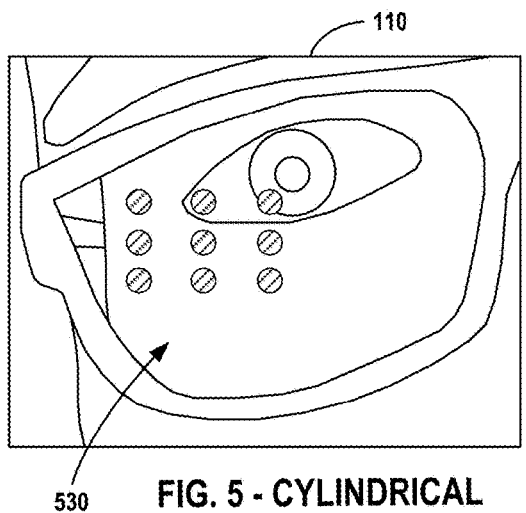
FIG. 5 – CYLINDRICAL
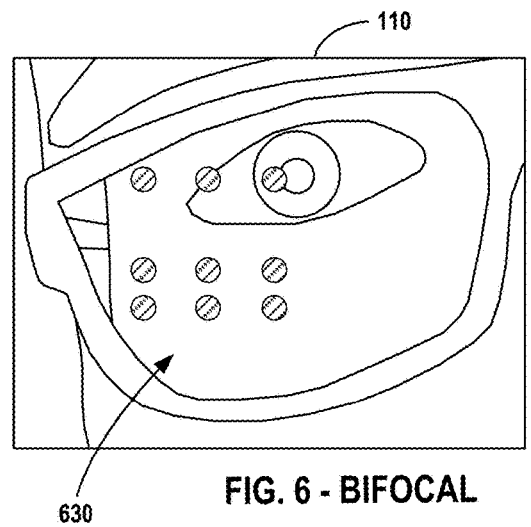
FIG. 6 – BIFOCAL
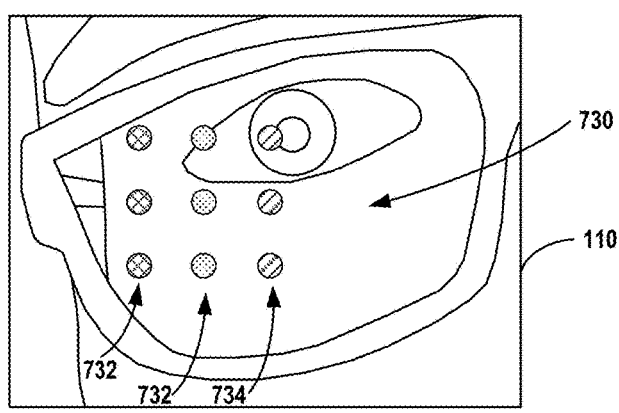
FIG. 7 – MULTIWAVE

AUTHENTICATION AND FACIAL RECOGNITION THROUGH ANALYSIS OF OPTOMETRIC PRESCRIPTION DATA

TECHNICAL FIELD

This disclosure relates to computing systems for analyzing visible media data.

BACKGROUND

Facial recognition systems may analyze an image of at least a portion of an individual's face to determine one or more facial dimensions of the individual. Facial recognition systems may then determine and/or verify the identity of the individual based on the facial dimensions. In some cases, when an individual is wearing eyewear when the image was obtained, a lens (or lenses) of the eyewear may distort some of the facial features of the user. Example types of eyewear include eyeglasses, sunglasses, spectacles, safety glasses, googles, ski goggles, and the like. In some cases, the individual may be actively trying to thwart facial recognition by wearing the eyewear. For instance, the individual may wear eyewear configured to produce an erroneous facial image, e.g., by distorting, masking, hiding, oversaturating (via inclusion of light sources), etc., at least a portion of the individual's face. Whether inadvertent or intentional, distortion of facial features may increase uncertainty in the facial dimensions and uncertainty in the determination and/or authentication of the individual via facial recognition.

SUMMARY

The present disclosure describes devices, systems, and methods for augmenting facial recognition by determining one or more eyewear lens parameters. The eyewear lens parameters may be used to correct a distorted facial feature in an image depicting a face of a person wearing eyewear, or the lens parameters may be used as an authentication factor for comparison to a personal characteristic of an identified person, e.g., an eyeglasses prescription of the identified person received from an electronic database.

In one example, this disclosure describes a method including: obtaining, by processing circuitry, an image depicting a face of a person wearing eyewear and a reflection pattern generated by projecting light onto a lens of the eyewear; determining, by the processing circuitry, an optical parameter of the lens based on the image; receiving, by the processing circuitry and from an electronic database, a personal characteristic data relating to a previously identified person; comparing, by the processing circuitry, the optical parameter of the lens to the personal characteristic data; and determining, by the processing circuitry and based on the comparison, a score indicative of a match between the person wearing eyewear and the previously identified person.

In another example, this disclosure describes a computing system including: an image capture device configured to obtain an image depicting a face of a person wearing eyewear and a reflection pattern generated by projecting light onto a lens of the eyewear; and one or more processors implemented in circuitry and in communication with a storage device, the one or more processors configured to: receive, from the image capture device, the image depicting a face of a person wearing eyewear, wherein the image includes structured light projected onto at least a lens of the eyewear; determine an optical parameter of the lens based on the image; receive, from an electronic database, a personal characteristic data relating to a previously identified person; compare the optical parameter of the lens to the personal characteristic data; and determine, based on the comparison, a score indicative of a match between the person wearing eyewear and the previously identified person.

In another example, this disclosure describes a non-transitory computer-readable medium having instructions stored thereon that, when executed, cause one or more processors to: receive at least one image depicting a face of a person wearing eyewear, wherein the image includes structured light projected onto at least a lens of the eyewear; determine an optical parameter of the lens based on the image; receive, from an electronic database, a personal characteristic data relating to a previously identified person; compare the optical parameter of the lens to the personal characteristic data; and determine, based on the comparison, a score indicative of a match between the person wearing eyewear and the previously identified person.

The details of one or more aspects of the disclosure are set forth in the accompanying drawings and the description below. Other features, objects, and advantages of the techniques described in this disclosure will be apparent from the description, drawings, and claims.

BRIEF DESCRIPTION OF THE DRAWINGS

FIG. 3 is a conceptual diagram illustrating an example image depicting a face of a person wearing eyewear and showing a laser dot pattern generated by a flat lens of the eyewear, in accordance with one or more aspects of this disclosure.

FIG. 4 is a conceptual diagram illustrating another example image depicting a face of a person wearing eyewear and showing a laser dot pattern generated by a spherical lens of the eyewear, in accordance with one or more aspects of this disclosure.

FIG. 5 is a conceptual diagram illustrating another example image depicting a face of a person wearing eyewear and showing a laser dot pattern generated by a cylindrical lens of the eyewear, in accordance with one or more aspects of this disclosure.

FIG. 6 is a conceptual diagram illustrating another example image depicting a face of a person wearing eyewear and showing a laser dot pattern generated by a bifocal lens of the eyewear, in accordance with one or more aspects of this disclosure.

FIG. 7 is a conceptual diagram illustrating another example image depicting a face of a person wearing eyewear and showing a laser dot pattern generated using multiple wavelengths, in accordance with one or more aspects of this disclosure.

DETAILED DESCRIPTION

Figure 1:
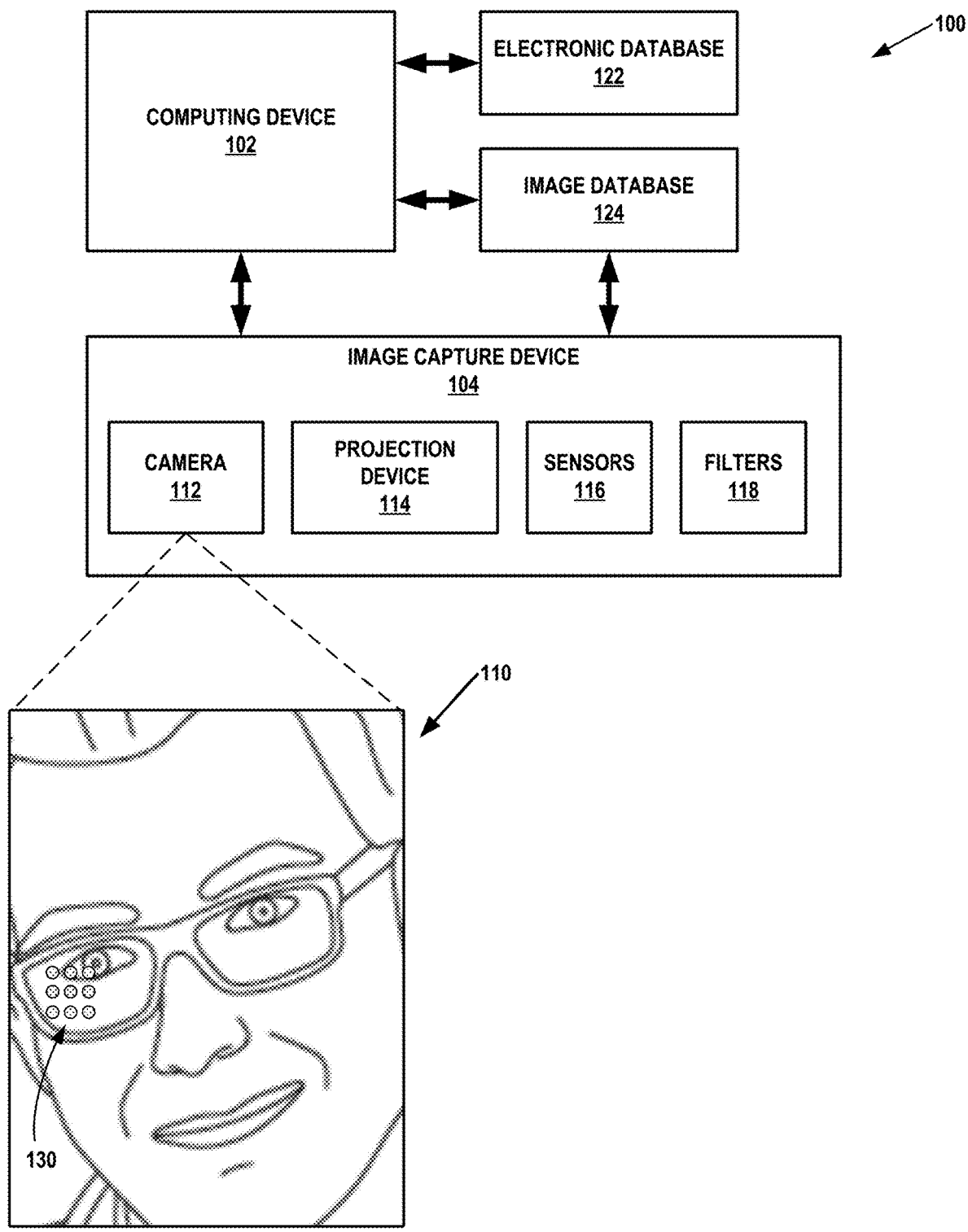
FIG. 1 is a block diagram illustrating an example system in accordance with one or more aspects of this disclosure.

FIG. 1 is a block diagram illustrating an example system 100 in accordance with one or more aspects of this disclosure. In the example of FIG. 1, system 100 includes computing device 102, image capture device 104, electronic database 122, and image database 124. Although illustrated as separate devices in communication with each other, computing device may include any or all of electronic database 122, image database 124, and image capture device 104, or image capture device 104 may include any or all of computing device 102, electronic database 122, or image database 124. In other examples, system 100 may include more, fewer, or different components. For instance, system 100 may include multiple computing devices 102, image capture devices 104, electronic databases 122, and image databases 124. Example types of computing devices include server devices, personal computers, mobile devices (e.g., smartphones, tablet computers, wearable devices), intermediate network devices, and so on.

Image capture device 104 may be configured to capture an image of at least a portion of a face of a person. In the example shown, image capture device 104 includes camera 112, projection device 114, sensors 116, and filters 118. In some examples, image capture device 104 may include fewer or more devices. For example, image capture device 104 may include just camera 112, and system 100 may separately include any or all of projection device 114, sensors 116, and filters 118. In some examples, sensors 116 and filters 118 may not be included in image capture device 104 or system 100, and/or may be optional.

Camera 112 is configured to capture an image of a real-world scene, which may include the face of a person. Camera 112 may include a lens and an image capture medium, such as a digital sensor array configured to convert an image formed by the lens to a digital image representing the real-world scene.

Projection device 114 is configured to project light onto one or more objects in the real-world scene imaged by camera 112. In the example shown, projection device 114 is configured to project a light pattern onto a lens of eyewear being worn by a person in the real-world scene. In some examples, projection device 114 is configured to project a pattern of light points and/or dots, diffuse light, or any suitable spatial/spectral distribution of light onto one or more objects in the real-world scene imaged by camera 112. In some examples, projection device 114 may be configured to project laser light. Projection device 114 is configured to project light within Occupational Health and Safety Organization (OSHA) standards.

Sensors 116 may include one or more sensors configured to sense signals corresponding one or more imaging parameters corresponding to an image captured by camera 112. Image capture device 104, or computing device 102, may determine a value or values of the one or more imaging parameters based on the sensed signals. Imaging parameters may include, but are not limited to, distances between camera 112 and one or more objects in the real-world scene, ambient light brightness level, and brightness levels of one or more objects in the real-world scene. For example, sensors 116 may be one or more ambient light sensors configured to sense an amount of light reaching camera 112 from at least a portion of the real-world scene. In some examples, sensors 116 may be configured to determine an amount of light from the real-world scene as a function of wavelength, or within certain spectral bands, e.g., visible, infrared (IR), ultraviolet (UV), or any suitable spectral band. Sensors 116 may include a ranging sensor configured to determine a depth and/or distance between camera 112 and one or more objects in the real-world scene. For example, sensors 116 may comprise a laser range finder, an ultrasonic sensor, a doppler sensor, a stereo camera, or any suitable sensor(s) configured to measure depth and/or distance.

Filters 118 may include one or more filters configured to condition the light captured by camera 112. For example, filters 118 may include one or more spatial filters, such as a vignette. Filters 118 may include one or more spectral filters, such as a high pass, low pass, band pass, or notch filter configured to selectively block/pass certain wavelengths of light.

Image database 124 is configured to receive, send, and store images. Image database 124 may be digital memory configured to store images in a digital format. Electronic database 122 is configured to receive, send, and store personal characteristic data. For example, personal characteristic data may include one or more facial recognition parameters and/or data corresponding to a previously identified person from a facial recognition database. Personal characteristic data may include eyewear prescription data, personal health data, one or more reference images of the previously identified person (e.g., a photo ID), or any other data suitable to determine one or more physical appearance characteristics of a previously identified person. Electronic database 122 may be digital memory configured to store images in a digital format. In some examples, image database 124 may be configured to store personal characteristic data, and/or electronic database 122 may be configured to store image data. In some examples, image database 124 and electronic database 122 may be a single database or portions of one or more memory devices.

Computing device 102, image capture device 104, image database 124 and electronic database 122 may be connected via a wired or wireless connection, and may be configured to send and receive images, personal characteristic data, and/or other data between each other. In some examples, any or all of computing device 102, image capture device 104, image database 124 and electronic database 122 may be directly connected, or may be connected via a network. For example, any or all of computing device 102, image capture device 104, image database 124 and electronic database 122 may be connected via a public network, such as the Internet. In some examples, a network connecting any or all of computing device 102, image capture device 104, image database 124 and electronic database 122 may comprise a combination of public and/or private networks. In some examples, such a network may comprise one or more of a wide area network (WAN) (e.g., the Internet), a local area network (LAN), a virtual private network (VPN), or another wired or wireless communication network.

In accordance with one or more techniques of this disclosure, system 100 is configured to obtain an image 110 depicting a face of a person wearing eyewear and determine a score indicative of a match between the person wearing eyewear and a previously identified person. Image capture device 104 may be configured to capture an image depicting a face of a person wearing eyewear including a reflection pattern generated by projecting light onto a lens of the eyewear. For example, camera 112 may capture an image depicting a face of a person wearing eyewear while projection device 114 projects light onto a lens of the eyewear. The image 110 may include a reflection pattern 130 generated by the projected light. In some examples, camera 112 may capture a sequence of images over a period of time while projection device 114 projects light which may change (e.g., a changing projection pattern) corresponding to each image in the sequence, or which may stay the same between two or more images of the sequence. Additionally, and optionally, sensors 116 may sense signals corresponding to one or more imaging parameters and filters 118 may condition the light captured by camera 112 while camera 112 captures an image or a sequence of images.

Computing device 102 may be configured to obtain the image, or sequence of images, depicting a face of a person wearing eyewear and reflection pattern 130 from the lens of the eyewear. For example, computing device 102 may obtain image 110 by receiving image 110 from a separate image capture device 104. In other examples, computing device 102 may include image capture device 104, camera 112, and/or projection device 114 and may obtain image 110 by generating image 110, e.g., via controlling camera 112 and projection device 114.

Computing device 102 may be configured to determine an optical parameter of the lens based on image 110. For example, image 110, and/or the reflection pattern 130 within image 110, may be indicative of one or more optical parameters of the lens, e.g., a surface shape, an index of refraction, an optical power, an eyewear prescription, a surface coating, a lens cut, an optical transmissivity, a photochromism, a tint, an optical polarization, or the like.

Computing device 102 may be configured to receive personal characteristic data relating to a previously identified person, e.g., from electronic database 122. For example, electronic database 122 may include personal characteristic data of one or more identified and/or known persons obtained at one or more previous times by system 100 or by any other system. Personal characteristic data may include an eyewear prescription, an eyewear specification, a pupil distance, an eyewear boundary, a facial feature, one or more reference images of the previously identified person including one or more facial features, or the like. An eyewear boundary may include an eyewear frame, an edge of an eyewear lens, an inner edge of an eyewear frame adjacent an eyewear lens, an outer edge of an eyewear frame, and the like. An eyewear specification may include a lens cut, one or more lens coatings, characteristics of the eyewear frame, a brand of eyewear and/or lens or frame, or any other suitable information relating to the eyewear which may be in addition to an eyewear prescription.

Computing device 102 may be configured to compare the determined optical parameter from image 110 to the received personal characteristic data from electronic database 122. Computing device 102 may be configured to determine a score indicative of a match between the person wearing the eyewear depicted in image 110 and the previously identified person related to the personal characteristic data based on the comparison. For example, computing device 102 may determine a first score based on a match between an eyewear prescription determined from image 110 and an eyewear prescription relating to the previously identified person. Computing device 102 may determine a second score based on a match between an eyewear prescription, a surface coating, and a photochromism determined from image 110 and an eyewear prescription, a surface coating, and a photochromism relating to the previously identified person, and the second score may be higher than the first score, e.g., indicating a higher degree of confidence of a match between the person wearing the eyewear depicted in image 110 and the previously identified person by virtue of more optical parameters of the lens depicted in image 110 matching personal characteristic data relating to the previously identified person.

Figure 2:
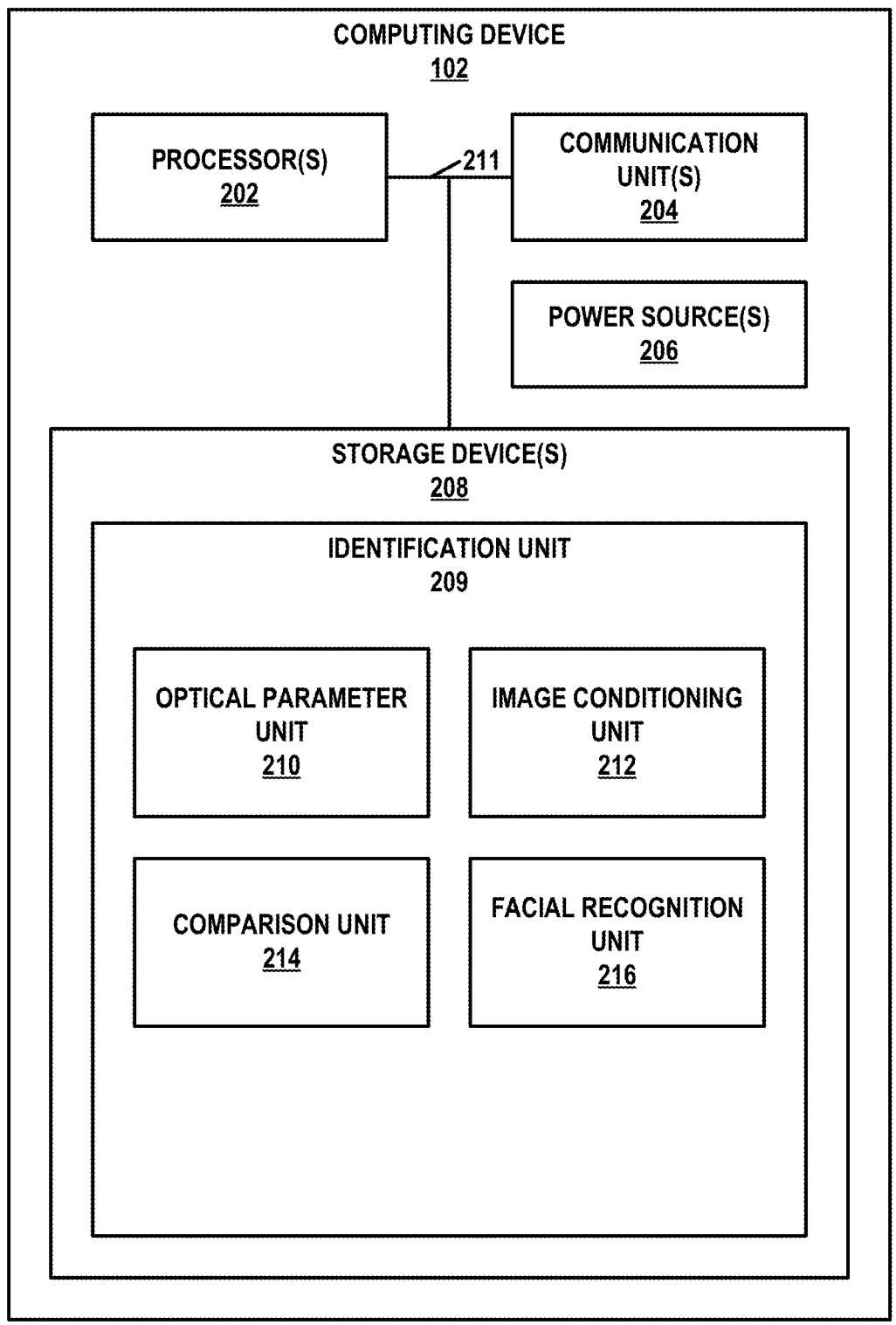
FIG. 2 is a block diagram illustrating example components of a computing system, in accordance with one or more aspects of this disclosure.

FIG. 2 is a block diagram illustrating example components of computing device 102 in accordance with one or more aspects of this disclosure. FIG. 2 illustrates only one example of computing device 102, without limitation on many other example configurations of computing device 102.

As shown in the example of FIG. 2, computing device 102 includes one or more processors 202, one or more communication units 204, one or more power sources 206, one or more storage devices 208, and one or more communication channels 211. Computing device 102 may include other components. For example, computing device 102 may include input devices, output devices, display screens, and so on. Communication channel(s) 211 may interconnect each of processor(s) 202, communication unit(s) 204, and storage device(s) 208 for inter-component communications (physically, communicatively, and/or operatively). In some examples, communication channel(s) 211 may include a system bus, a network connection, an inter-process communication data structure, or any other method for communicating data. Power source(s) 206 may provide electrical energy to processor(s) 202, communication unit(s) 204, storage device(s) 206 and communication channel(s) 211. Storage device(s) 208 may store information required for use during operation of computing device 102.

Processor(s) 202 comprise circuitry configured to perform processing functions. For instance, one or more of processor(s) 202 may be a microprocessor, an application-specific integrated circuit (ASIC), a field-programmable gate array (FPGA), or another type of processing circuitry. In some examples, processor(s) 202 of computing device 102 may read and execute instructions stored by storage device(s) 208. Processor(s) 202 may include fixed-function processors and/or programmable processors. Processor(s) 202 may be included in a single device or distributed among multiple devices.

Communication unit(s) 204 may enable computing device 102 to send data to and receive data from one or more other computing devices (e.g., via a communications network, such as a local area network or the Internet). In some examples, communication unit(s) 204 may include wireless transmitters and receivers that enable computing device 102 to communicate wirelessly with other computing devices. Examples of communication unit(s) 204 may include network interface cards, Ethernet cards, optical transceivers, radio frequency transceivers, or other types of devices that are able to send and receive information. Other examples of such communication units may include BLUETOOTH™, 3G, 4G, 5G, and WI-FI™ radios, Universal Serial Bus (USB) interfaces, etc. Computing device 102 may use communication unit(s) 204 to communicate with one or more other computing devices or systems. Communication unit(s) 204 may be included in a single device or distributed among multiple devices.

Processor(s) 202 may read instructions from storage device(s) 208 and may execute instructions stored by storage device(s) 208. Execution of the instructions by processor(s) 202 may configure or cause computing device 102 to provide at least some of the functionality ascribed in this disclosure to computing device 102. Storage device(s) 208 may be included in a single device or distributed among multiple devices.

As shown in the example of FIG. 2, storage device(s) 208 may include computer-readable instructions associated with identification unit 209. In the example of FIG. 2, identification unit 209 may include an optical parameter unit 210, an image conditioning unit 212, a comparison unit 214, and a facial recognition unit 216. In other examples, identification unit 209 may include more, fewer, or different units. Moreover, the units of identification unit 209 shown in the example of FIG. 2 are presented for purposes of explanation and may not necessarily correspond to actual software units or modules within identification unit 209.

Optical parameter unit 210 may be configured to determine an optical parameter of an object depicted in an image or sequence of images, e.g., an eyewear lens of image 110. For example, image 110 may include a reflection pattern 130, and reflection pattern 130 may be indicative of one or more optical parameters of the object. In some examples, reflection pattern 130 may be a reflection of a structured light pattern projected onto the lens via projection device 114. Optical parameter unit 210 may be configured to determine an optical parameter of the lens based on features of the reflection pattern 130. For example, the projected light may include structured light, and the structured light may include features such as known intensity and positions of one or more light structures. Reflections of the features from an object (e.g., a lens) are captured by camera 112 as reflection pattern 130 in image 110. Deviations (or lack thereof) between the features of the projected light and the reflections of the features may indicate a surface shape and/or index of refraction interface (e.g., an optical interface) at one or more surfaces of the lens. Although described as a single reflection pattern 130, reflection pattern 130 may include a plurality of individually distinguishable reflection patterns such as described below. FIGS. 3-9, further described below, include examples of features from which optical parameter unit 210 may be configured to determine an optical parameter of an object depicted in image 110. In some examples, optical parameter unit 210 may determine an optical parameter of the lens at least in part based on user input. For example, optical parameter unit 210 may receive information from a user requesting and/or attempting to access a resource (e.g., either at the time of attempting to access the resource or at an initial account setup time), and optical parameter unit 210 may determine an optical parameter based at least in part on the received information. For example, the user may interact with computing device 102, e.g., via a user interface, to provide eyewear prescription information.

In some examples, reflection pattern 130 may alternatively or additionally include a diffraction pattern. For example, an object may include a patterned surface, and the projected light may both reflect and diffract from the surface and be captured as reflection pattern 130 in image 110. The captured diffraction pattern may include, or may be, an example of a feature or features of reflection pattern 130. In some examples, reflection pattern 130 may alternatively or additionally include a polarization pattern. For example, a polarization state of the projected light may be changed by interaction with the object, e.g., via reflection alone, or via reflection in addition to transmission through a birefringent material. Camera 112 may be configured to capture a polarization state of reflected light (e.g., camera 112 and/or sensors 116 may optionally include a polarimeter, and/or filters 118 may include one or all of a linear polarizer, circular polarizer, or retarder that may be used with camera 112) as reflection pattern 130 in image 110. The captured polarization state may include, or may be, an example of a feature or features of reflection pattern 130.

FIGS. 3-7 illustrate example reflections patterns 330, 430, 530, and 630 from which optical parameter unit 210 may determine an optical parameter of the lens such as a surface shape of the lens. Reflections patterns 330, 430, 530, 630, and 730 may be examples of reflection pattern 130 described herein. Each of the examples of FIGS. 3-7 illustrate reflection patterns 330-730 resulting from a 3×3 laser dot pattern projected onto the lens in a rectangular array and having equal spacing between the dots. In other examples, the projected light may include fewer or more dots arranged in any suitable pattern with any suitable orientation (e.g., a rotated rectangular array, a hexagonal array, a radial array, and the like) with any suitable spacing. Additionally, the projected light may include other light structures in lieu of, or in addition to dots. In some examples, the projected light may be laser light or non-laser light. The projected light may be any suitable structured light pattern including a predetermined spatial structure, a predetermined spectral content, a predetermined polarization state, a predetermined degree of spatial and/or temporal coherence, and the like, alone or in any combination. As stated above, optical parameter unit 210 may be configured to determine an optical parameter of the lens based on features of reflection pattern 130, and features of reflection pattern 130 may include deviations (or lack thereof) of any of the predetermined spatial structure, predetermined spectral content, predetermined polarization state, predetermined degree of spatial and/or temporal coherence, and the like, alone or in any combination, of the projected structured light. In the examples of FIGS. 3-7, the projected structured light includes a spatial structure, e.g., the 3×3 dot pattern, and reflection patterns 330-730 include corresponding spatial structure features including deviations (or lack thereof) from the projected structured light. In the examples of FIGS. 3-7, optical parameter unit 210 may be configured to determine optical parameters such as a lens cut of the lens and/or surfaces of the lens, e.g., whether the lens or lens surfaces are flat, spherical, cylindrical, bifocal, trifocal, Fresnel, or the like, and or any corresponding surface radii of curvature of the lens surfaces and optical powers of the lens.

FIG. 3 is a conceptual diagram illustrating an example image 110 depicting a face of a person wearing eyewear and showing a reflection pattern 330 including reflected laser dots generated by a flat lens of the eyewear, in accordance with one or more aspects of this disclosure. In the example shown, the positions of the individual laser dots have not changed and the spacing of the individual dots of reflection pattern 330 is equal in the vertical and/or horizontal directions. Based on the positions and/or spacings, e.g., no change from a baseline or expected positions/spacings, optical parameter unit 210 may be configured to determine that the surface of the lens is substantially flat or has substantially no curvature. In some examples, optical parameter unit 210 may determine an index of refraction of the lens based on one or more intensities of the individual dots of reflection pattern 330, e.g., via determining an amount of Fresnel reflection from the surface from which to calculate the index of refraction.

FIG. 4 is a conceptual diagram illustrating another example image 110 depicting a face of a person wearing eyewear and showing a reflection pattern 430 including reflected laser dots generated by a spherical lens of the eyewear, in accordance with one or more aspects of this disclosure. In the example shown, the positions of the individual dots have changed relative to the projected light, and the spacings of the individual dots are symmetrically compressed in both the vertical and/or horizontal directions relative to the projected light. Based on the positions and/or spacings, e.g., a symmetrical change from baseline or expected projected light positions/spacings, optical parameter unit 210 may determine that the surface of the lens is substantially spherical and convex relative to camera 112. In some examples, based on the amount of change of the positions/spacings of the individual dots of reflection pattern 430, optical parameter unit 210 may determine a radius of curvature of the spherical surface of the lens. Further, based on the direction of change of individual dots, optical parameter unit 210 may be configured to determine whether the lens is convex or concave relative to camera 112. For example, if reflection pattern 430 were to include a symmetrical expansion of the dots rather than compression, optical parameter unit 210 may determine that the lens is substantially spherical, concave, and may determine a radius of curvature of the surface based on the amount of change in the positions/spacings of the dots. As with reflection pattern 330, optical parameter unit 210 may determine an index of refraction of the lens based on one or more intensities of the individual dots of reflection pattern 430.

FIG. 5 is a conceptual diagram illustrating another example image 110 depicting a face of a person wearing eyewear and showing a reflection pattern 530 including reflected laser dots generated by a cylindrical lens of the eyewear, in accordance with one or more aspects of this disclosure. In the example shown, the positions of the individual dots have changed relative to the projected light, and the spacings of the individual dots are asymmetrically compressed between the vertical and horizontal directions, e.g., with the dots compressing in the vertical direction but not the horizontal direction relative to the projected light. Based on the positions and/or spacings, e.g., an asymmetrical change from baseline or expected projected light positions/spacings, optical parameter unit 210 may be configured to determine that the surface of the lens includes convex cylindrical curvature. Further, based on the direction of change of individual dots, optical parameter unit 210 may determine whether the cylindrical curvature of the lens is convex or concave relative to camera 112, and an axis of the cylindrical curvature. For example, if reflection pattern 530 were to include an asymmetrical expansion of the dots rather than compression, optical parameter unit 210 may determine that the lens includes concave cylindrical curvature, and may determine a radius of curvature of the cylindrical curvature and an orientation of an axis of the cylindrical curvature based on the amount of change in the positions/spacings of the dots and the directionality of the changes. As with reflection pattern 330, optical parameter unit 210 may determine an index of refraction of the lens based on one or more intensities of the individual dots of reflection pattern 530.

FIG. 6 is a conceptual diagram illustrating another example image 110 depicting a face of a person wearing eyewear and showing a reflection pattern 630 including reflected laser dots generated by a bifocal lens of the eyewear, in accordance with one or more aspects of this disclosure. In the example shown, the positions of the individual dots have changed relative to the projected light, and the spacings of the individual dots include a change indicating a discontinuity in the surface of the lens. Based on the positions and/or spacings, e.g., different symmetrical and/or asymmetrical changes from baseline or expected projected light positions/spacings in different areas of the lens, optical parameter unit 210 may be configured to determine that the surface of the lens includes different curvatures in different areas of the lens, e.g., different convex or concave spherical and/or cylindrical curvatures. Further, based on the direction of change of individual dots, optical parameter unit 210 may determine whether the curvatures of the lens are convex or concave relative to camera 112, and any axes of any cylindrical curvature. As with reflection pattern 330, optical parameter unit 210 may determine one or more indices of refraction of the lens based on one or more intensities of the individual dots of reflection pattern 630.

In some examples, optical parameter unit 210 may be configured to determine an optical power or powers of the lens based on reflection patterns 330-630. For example, any of reflection patterns 330, 430, 530, and 630 may further include a reflection pattern from the rear surface of the lens (not shown) in addition to the front surface (e.g., the front surface being the surface closest to camera 112). For example, a first portion of projected light may reflect from the front surface of a lens and be captured by camera 112 as a first reflection pattern. A second portion of the same projected light may propagate through the material of the lens and reflect from the rear surface of the lens and be captured by camera 112 as a second reflection pattern. The first reflection pattern may include information regarding the front surface, e.g., a surface shape, as well as the index of refraction of the lens, based on features of the first reflection pattern, e.g., feature locations and intensity. The second reflection pattern may include information regarding the rear surface, e.g., a surface shape, as well as the index of refraction of the lens, based on features of the second reflection pattern, e.g., feature locations and intensity. The first reflection pattern and the second reflection pattern may be individually distinguishable from each other. In some examples, optical parameter unit 210 may be configured to determine the surface shape of the front surface based on the first reflection pattern, a surface shape of the rear surface based on the second reflection pattern, and an index of refraction of the lens from one or both of the first and second reflection patterns. In some examples, optical parameter unit 210 may be configured to determine an optical power of the lens based on one or both of the first and second reflection patterns.

In some examples, optical parameter unit 210 may be configured to determine an optical parameter and/or an optical power or powers of the lens based on additional reflection patterns. For example, any of reflection patterns 330, 430, 530, and 630 may further include a reflection pattern from a skin surface of the person wearing the eyewear, or a front corneal surface of the person wearing the eyewear. A portion of the projected light may be reflected from such additional surfaces and the resulting reflection pattern(s) captured in image 110 may be distorted by the lens such that optical parameter unit 210 may be configured to determine an optical parameter based on the reflection patterns from the additional surfaces. In some examples, a portion of the projected light may be reflected from such additional surfaces and an intensity of the resulting reflection pattern(s) captured in image 110 may be indicative of a transmissivity of the lens, and optical parameter unit 210 may be configured to determine a transmissivity of the lens based on the reflection patterns from the additional surfaces. In some examples, optical parameter unit 210 may be configured to determine a transmissivity and/or reflectivity of the lens as a function of wavelength based on the reflection patterns from the additional surfaces, and optical parameter unit 210 may be configured to determine a tint of the lens based on the determined transmissivity and/or reflectivity of the lens as a function of wavelength.

In some examples, image 110 may be a sequence of images and optical parameter unit 210 may be configured to determine an optical parameter of the lens based on two or more reflection patterns, each from an image of the sequence of images. For example, projection device 114 may project a diffuse, broadband light pattern having a predetermined intensity onto the lens for a predetermined amount of time. The predetermined intensity and amount of time may be configured to cause a photochromic response of the lens, and camera 112 may capture image 110 including first reflection pattern 130 resulting from the projected light at the beginning of, and/or during, the predetermined amount of time. Camera 112 may then capture a second image 110 including a second reflection pattern while projection device 114 projects a light pattern on to the lens. The projection device 114 may project the same diffuse, broadband light pattern having a predetermined intensity as the first image 110, or a different light pattern. The second image 110 includes a second reflection pattern 130 resulting from the light pattern projected by projection device 114 while camera 112 captured second image 110 In some examples, the second reflection pattern 130 may be different from the first reflection pattern 130. Optical parameter unit 210 may be configured to determine a transmissivity of the lens based on the first and second reflection patterns, e.g., an intensity difference in the first and reflection patterns. For example, the alteration of the reflection pattern may be compared with one or more expected alterations based on known properties of lenses. The alterations may be directly compared and/or lens properties including transmissivity, and/or properties from which transmissivity may be determined, may be determined via machine learning. Optical parameter unit 210 may be configured to determine a photochromism of the lens based on the transmissivity, and optionally and additionally based on the predetermined projected light intensity during the predetermined amount of time, and the predetermined amount of time. In some examples, optical parameter unit 210 may be configured to determine a photochromism of the lens based on a single image 110, e.g., based on just the second reflection pattern of the second image 110. In other words, image capture device 104 may project light configured to cause a photochromic response of the lens, and camera 112 may capture a light including a reflection pattern 130 after the lens responds with at least a portion of a photochromic response. In some examples, image capture device 104 may be configured to capture one or more images including changes in reflection pattern 130 due to a relatively fast photochromic response of the lens, e.g., 10 milliseconds or less, from which optical parameter unit 210 may be configured to determine a photochromism of the lens. In some examples, image capture device 104 may be configured to capture one or more images including changes in reflection pattern 130 due to a photochromic response of the lens on a different timescale, e.g., 10 milliseconds or more, from which optical parameter unit 210 may be configured to determine a photochromism of the lens.

For example, projection device 114 may project diffuse, broadband light onto the lens for 10 milliseconds (ms) at 100 lumens, 10 ms at 200 lumens, 10 ms at 300 lumens, while also projecting a light pattern and image capture device 104 may capture an image including a reflection pattern 130 at each projected light level, and optical parameter unit 210 may be configured to determine an activation source strength of the photochromism of the lens. Alternatively and/or additionally, image captured device 104 may capture subsequent images including reflection patterns without the diffuse, broadband light being projected onto the lens. Optical parameter unit 210 may be configured to determine a photochromic reaction and/or relaxation time, e.g., to go back to its "normal" higher transmission state.

FIG. 7 is a conceptual diagram illustrating another example image 110 depicting a face of a person wearing eyewear and showing a reflection pattern 730 including reflected laser dots generated by a cylindrical lens of the eyewear, in accordance with one or more aspects of this disclosure. FIG. 7 illustrates an example reflection patterns 730 from which optical parameter unit 210 may determine an optical parameter of the lens such as a material property and/or a coating of the lens. In the example shown, reflection pattern 730 results from a 3×3 dot pattern including dots of differing colors projected onto the lens in a vertical-horizontal orientation and having equal spacing between the dots. For example, reflection pattern 730 includes both spatial and spectral features, e.g., reflection pattern 730 may include a plurality of reflection patterns 732, 734, and 736 each corresponding to a particular wavelength. Alternatively stated and/or viewed, the plurality of reflection patterns of reflection pattern 730 may be considered to be a single reflection pattern that varies as a function of wavelength. In addition to surface shape and index of refraction of the lens and/or its surfaces, optical parameter unit 210 may be configured to determine a dispersion of the lens, e.g., based on the positions, spacings, and intensities of the individual dots of reflection pattern 730 as a function of wavelength.

Optical parameter unit 210 may be configured to determine one or more materials of the lens based on the spatial/spectral features of reflection pattern 730 and/or the determined dispersion. For example, optical parameter unit 210 may be configured to determine whether the lens comprises a glass or a plastic or other polymer or transparent material, and whether the glass is a crown or a flint glass and/or the specific crown/flint glass, e.g., a lanthanum dense flint (LaSF), a dense flint (SF10), a flint (F2), a barium crown (BaK4), a borosilicate crown (BK7), a fluorite crown (FK51A). For example, known material dispersion curves may be fit and/or matched to the determined dispersion to determine the material. In some examples, optical parameter unit 210 may be configured to determine one or more materials of the lens based on a comparison of a determined eyewear prescription to lens and material types received from database 122 that have certain light or reflective properties (e.g., that may be compared to reflection pattern 730). In some examples, optical parameter unit 210 may determine lens type based on spatial/spectral features of reflection pattern 730, and may be configured to determine lens type at least in part via machine learning.

In some examples, reflection pattern 730 may include a plurality of reflection patterns from a plurality of surfaces of the lens that each vary as a function of wavelength. The plurality of reflection patterns may be individually and separately distinguishable. Optical parameter unit 210 may be configured to determine whether the lens is an achromatic lens, and the materials of the achromatic lens, based on the spatial/spectral features of the plurality of reflection patterns that vary as a function of wavelength and that comprising reflection pattern 730, and/or determined dispersions of reflection pattern 730 (such as described just above).

In some examples, reflection pattern 730 may include a reflection pattern that varies as a function of wavelength caused by something other than material dispersion, e.g., interference and/or diffraction. For example, optical parameter unit 210 may be configured to determine whether the lens is a Fresnel lens based on, and/or whether the lens includes one or more surface coatings, based on spatial/spectral features of reflection pattern 730. In some examples, the optical parameter unit 210 may be configured to determine an optical power and/or other Fresnel lens characteristics of the lens based on spatial/spectral features of reflection pattern 730. In some examples, optical parameter unit 210 may be configured to determine an anti-reflection (AR) coating and/or AR coating characteristics (e.g., the reflectivity as a function of wavelength, the number and materials of coating layers, and the like) of the lens based on spatial/spectral features of reflection pattern 730. For example, optical parameter unit 210 may be configured to determine AR characteristics based on reflectivity as a function of wavelength, lack of an expected amount of reflected light, and the like, based on reflection pattern 730. In some examples, optical parameter unit 210 may be configured to determine a hydrophobic and/or oleophobic coating and/or a hard coating of the lens (e.g., "easy clean" and/or "anti-scratch") based on spatial/spectral features of reflection pattern 730. Coatings such as AR, easy clean, or anti-scratch coatings, and lens materials such as high index glasses or plastics, may be examples of optical parameters such as eyewear specification data. Lens surface curvatures and optical powers may be examples of optical parameters such as eyewear prescription data.

Returning to FIG. 2, image conditioning unit 212 may be configured to determine that image 110 includes and oversaturation and/or overexposure region and cause image capture device 104 to condition received light and/or image 110 prior to optical parameter unit 210 determining an optical parameter based on image 110. An oversaturation region may be a portion of image 110 in which the amount of light received exceeds the range of the detectors of camera 112, e.g., the light in the region is too bright to capture any spatial differences in the light in the oversaturated region.

In some examples, based on image conditioning unit 212 determining that image 110 includes an oversaturation region, and may apply a digital filter to at least a portion of image 110. For example, image conditioning unit 212 may be configured to change brightness values of at least a portion of image 110, for example, according to an image processing algorithm to correct and/or reduce the determined oversaturation.

In some examples, based on image conditioning unit 212 determining that image 110 includes an oversaturation region, image capture device 104 may utilize one or more filters 118 to condition the light received by camera 112 to capture a subsequent image 110 (or sequence of images 110), e.g., a spectral bandpass and/or notch filter 118. In some examples, the filters 118 may include an ultraviolet (UV) cut filter configured to reduce an amount of UV light captured by camera 112. In some examples, filters 118 may include an infrared (IR) cut configured to reduce an amount of IR light captured by camera 112. Filters 118 may include any suitable bandpass, notch, and/or neutral density filter configured to change and/or reduce a portion of the light that would otherwise oversaturate camera 112 and/or cause a portion of image 110 to be oversaturated, e.g., where oversaturation refers to an amount of light that is larger and/or more than the responsivity of the detectors of the camera 112. In some examples, optical parameter unit 210 may be configured to determine an optical parameter of an object depicted in the subsequent image 110 or subsequent sequence of images 110.

Figure 10:
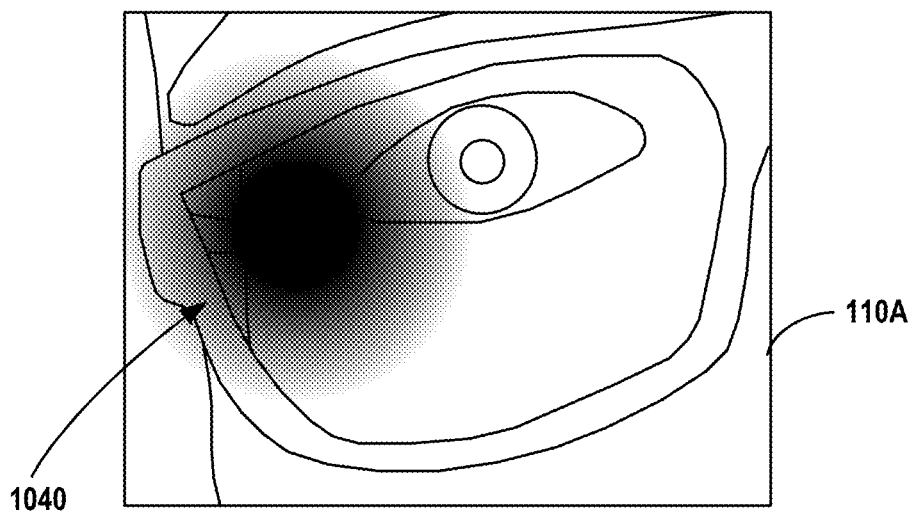
FIG. 10 is a conceptual diagram illustrating an example image depicting a face of a person wearing eyewear producing an occlusion, in accordance with one or more aspects of this disclosure.
Figure 11:
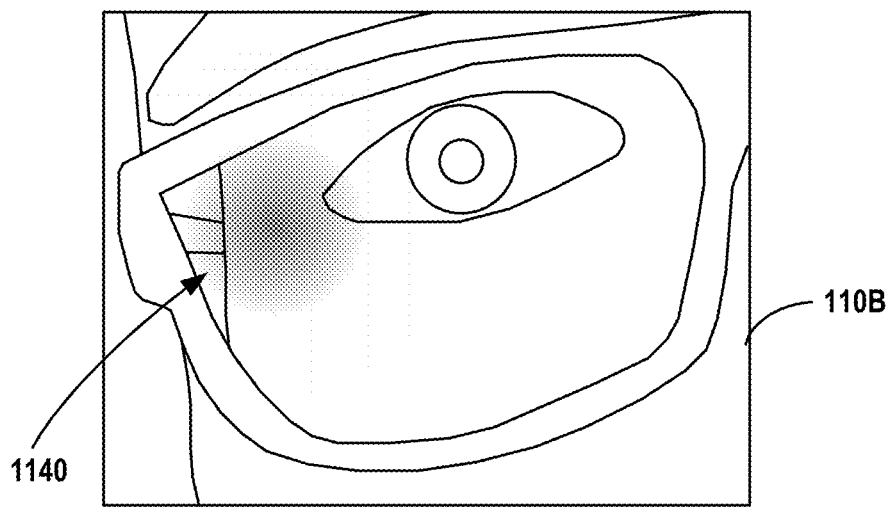
FIG. 11 is a conceptual diagram illustrating an example image depicting a face of a person wearing eyewear producing with the occlusion of FIG. 10 reduced, in accordance with one or more aspects of this disclosure.

FIGS. 10 and 11 illustrate an example of correcting and/or reducing an oversaturation region 1040. FIG. 10 is a conceptual diagram illustrating an example image 110 depicting a face of a person wearing eyewear and including an oversaturation region 1040, in accordance with one or more aspects of this disclosure. FIG. 11 is a conceptual diagram illustrating an example image 110 depicting a face of a person wearing eyewear and including an corrected region 1140, in accordance with one or more aspects of this disclosure.

In some examples, image conditioning unit 212 may determine that image 110A includes oversaturation region 1040. In some examples, oversaturation region 1040 may be an ambient light reflection from the lens of the eyewear of image 110A, e.g., glint from sunlight, glint from automobile headlights, glare from an optical source, or the like. In other examples, oversaturation region 1040 may be from a light source, e.g., a visible, UV, or IR light source included with the eyewear and intended to oversaturate at least a portion of image 110A, e.g., to obscure at least a portion of the face to defeat a facial recognition system.

Image conditioning unit 212 may be configured to determine that image 110 includes oversaturation region 1040, and may be further configured apply a digital filter to at least a portion of image 110. For example, image conditioning unit 212 may be configured to change brightness values of oversaturation region 1040, for example, according to an image processing algorithm configured to correct and/or reduce the determined oversaturation. Image conditioning unit 212 may be further configured to cause optical parameter unit 210 to determine an optical parameter based on the image after correcting/reducing oversaturation region 1040.

In some examples, image conditioning unit 212 may be configured to determine the strength of the oversaturation and cause image capture device 104 to utilize an appropriate filter. In some examples, image conditioning unit 212 may be configured to use time variation with one or more filters 118. For example, image conditioning unit 212 may be configured to cause image capture device 104 to capture a sequence of images with a 10 ms exposure time using a variety of filters, e.g., a UV notch filter and an IR notch filter. In some example, image conditioning unit 212 may be configured to determine whether the oversaturation is accidental, e.g., via the sequence of images and determining a wavelength range of the oversaturation light, such as a red laser pointer accidentally directed onto the lens concurrent with image capture and causing the oversaturation.

Alternatively and/or additionally, image conditioning unit 212 may be configured to cause image capture device 104 to capture subsequent image 110B while utilizing one or more filters 118 to condition the light received by camera 112. In some examples, the filters 118 may be configured to reduce and/or eliminate the light causing oversaturation region 1040, e.g., ambient light reflections, sun glint, headlight glint, visible, UV, or IR light intended to cause oversaturation region 1040, and the like. In the example shown, subsequent image 110B includes corrected region 1140, which may be a reduction and/or correction of oversaturation region 1040. In the example shown, detail regarding the discontinuity of facial edge 304 relative to facial edge 302 due to a negative power eyewear lens is improved in subsequent image 110B as compared to image 110A.

Comparison unit 214 may be configured to receive personal characteristic data relating to a previously identified person and to compare one or more optical parameters determined by optical parameter unit 210 to the personal characteristic data. Comparison unit 214 may be further configured to determine a score indicative of a match between the person wearing the eyewear in image 110 and the previously identified person based on the comparison.

For example, comparison unit 214 may receive eyewear prescription and/or specification data, personal health data, one or more facial recognition parameters and/or data such as a pupil distance, an eyewear boundary, a facial feature, one or more reference images of the previously identified person (e.g., a photo ID), or any other suitable previously captured physical appearance characteristics attributable to a previously identified person from electronic database 122. Comparison unit 214 may compare the personal characteristic data, e.g., an eyewear prescription, with the optical parameter determined by optical parameter unit 210 based on image 110, e.g., eyewear prescription data of the lens depicted in image 110.

In some examples, comparison unit 214 may be configured to determine a score based on the comparison. For example, comparison unit 214 may be configured to determine a low score for a mismatch between the spherical optical power of an eyewear prescription of a previously identified person received from electronic database 122 and the spherical optical power of the lens depicted in image 110 determined by optical parameter unit 210. Comparison unit 214 may be configured to determine a high score for a match between the spherical optical power of an eyewear prescription of a previously identified person received from electronic database 122 and the spherical optical power of the lens depicted in image 110 determined by optical parameter unit 210.

Comparison unit 214 may be configured to determine a increase the score based on a match between additional, e.g., multiple, personal characteristic data and optical parameters, and decrease the score based on a mismatch between additional personal characteristic data and optical parameters. For example, comparison unit 214 may be configured to determine an increase to the score based on a match between a cylindrical optical power in addition to the spherical optical power of an eyewear prescription of a previously identified person received from electronic database 122 and a cylindrical optical power in addition to the spherical optical of the lens depicted in image 110 determined by optical parameter unit 210.

Facial recognition unit 216 may be configured to correct one or more facial features of the depiction of the face in image 110 distorted by the eyewear based on the optical parameter determined by optical parameter unit 210. For example, eyewear may change a position of one or more facial features, such as a pupil position, which may in turn change a facial feature, such as a distance between pupils. FIGS. 3-4 illustrate an example of the lens causing a distortion of a facial edge 302. FIG. 3 includes facial edge 302, which is blocked for a portion of its length by the frames of the eyewear in image 110. Facial edge 302 is not distorted in FIG. 3 because the lens of FIG. 3 is a flat lens. FIG. 4 includes facial edge 302 and distorted facial edge 304 within the lens of image 110 of FIG. 4. Facial edge 302 is distorted in FIG. 4 because the lens of FIG. 4 has optical power, e.g., a negative optical power in the examples shown in FIGS. 4-7 (and FIGS. 8-11), such as a lens configured to correct myopia/nearsightedness.

In some examples, facial recognition may be degraded and/or prevented by a distortion caused by the eyewear lens. Facial recognition unit 216 may be configured to correct and/or interpret the distortions to improve facial recognition. For example, facial recognition unit 216 may be configured to interpret the distortions based on the optical parameter, and facial recognition unit 216 may be configured to determine that the distortions are caused by the optical parameter and as supplemental information to improve facial recognition. In some examples, facial recognition unit 216 may be further configured to perform facial recognition on image 110 after correcting and/or interpreting the distortions of one or more facial features. For example, facial recognition unit 216 may be configured to correct and/or interpret facial features and/or boundaries via a facial geometry detection algorithm, such as Viola Jones, rasterization based edge detection, neural networks, and the like. For example, facial recognition unit 216 may be configured to detect a facial edge and/or eyewear boundaries, eyewear frame boundaries, eyewear lens boundaries, and the like.

Figure 8A:
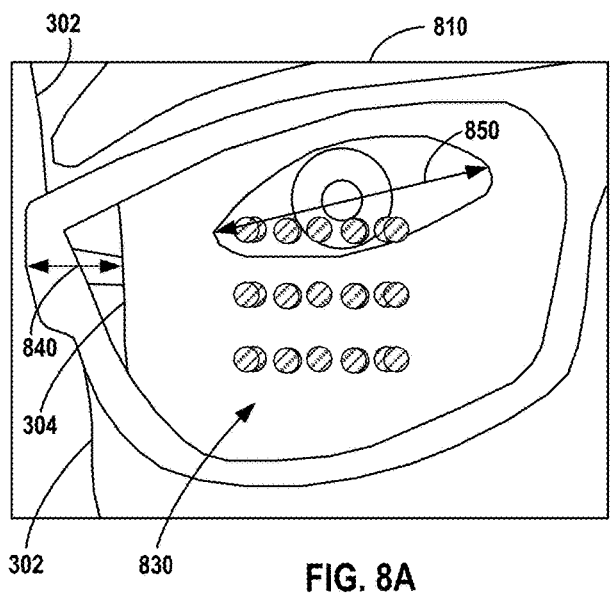
FIG. 8A is a conceptual diagram illustrating an example image depicting a face of a person wearing eyewear and a reflection pattern, in accordance with one or more aspects of this disclosure.
Figure 9A:
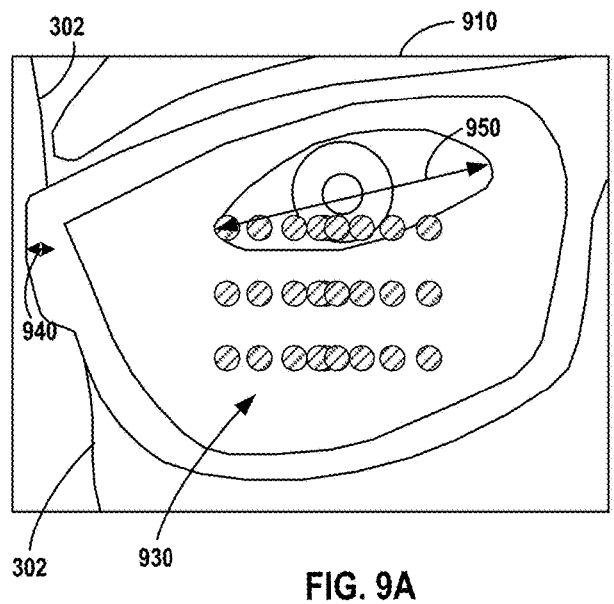
FIG. 9A is a conceptual diagram illustrating another example image depicting a face of a person wearing eyewear and showing a reflection pattern, in accordance with one or more aspects of this disclosure.

In some examples, facial recognition unit 216 may be configured to correct and/or interpret a reflection pattern distorted due to facial depth of the face depicted in image 110. For example, facial recognition unit 216 may be configured to use input parameters such as eye location, pupil location, eye lid shape, nose location, face edge-to-eye distance, and the like, into one or more regression, interpolation, and/or machine learning techniques, e.g., linear and/or logistic regression, splines, convolutional neural network techniques, generative adversarial network techniques, and the like, to correct a distorted reflection pattern. For example, as illustrated in FIGS. 8A and 9A, face edge distances 840 and 940, and eye widths 850 and 950, are distorted by different amounts based on the optical power of the lens in images 810 and 910, respectively, as well as the depth of the face of the person depicted in images 810 and 910, e.g., from the lens. Facial recognition unit 216 may be configured to correct and/or interpret reflection patterns 830 and 930, respectively, based on face edge distance and eye width input parameters and the techniques described above.

In some examples, comparison unit 214 may be configured to compare the corrected facial feature to a personal characteristic. For example, facial recognition unit may correct a pupil position and/or a pupil distance based on the determined optical parameter, and comparison unit 214 may be configured to compare the corrected pupil position and/or distance, e.g., rather than a pupil distance that may be determined via facial recognition executed on image 110 without correction by facial recognition unit 216, to a pupil position and/or distance of a previously identified person received from electronic database 122.

In some examples, comparison unit 214 and/or facial recognition unit 216 may be configured to compare image 110 with one or more reference images, e.g., personal characteristic data including an image of a previously identified person's face from electronic database 122. In some examples, comparison unit 214 and/or facial recognition unit 216 may be configured to compare image 110 with one or more reference images before and/or after correcting a facial feature of image 110 based on the determined optical parameter(s). In some examples, the one or more reference images may include an image of a previously identified person's face without eyewear. Comparison unit 214 and/or facial recognition unit 216 may be configured to determine and/or form a comparison image of the face depicted in image 110 without the eyewear, e.g., to modify image 110 to remove the eyewear (e.g., via image processing techniques) for comparison with the one or more reference images. In some examples, comparison unit 214 and/or facial recognition unit 216 may be configured to correct the comparison image for distortions of the face depicted in image 110 when removing the eyewear, e.g., based on the determined optical parameter(s). For example, comparison unit 214 and/or facial recognition unit 216 may be configured to correct one or more facial features of the face depicted in image 110 when removing the eyewear via interpolation, color balancing via a color balancing algorithm to improve matching and/or comparability between the comparison image the one or more reference images, and the like.

In some examples, comparison unit 214 may be configured to determine and correct for one or more temporary facial features of the face depicted in image 110. For example, in addition to eyewear, the face depicted in image 110 may include one or more temporary facial conditions and/or obstructions that obscure and/or reduce the confidence of conventional facial recognition, but may be used by system 100 to enhance determination of the identity of the face depicted in image 110. For example, the face depicted in 110 may include a scar, abrasion, sore, cut, blemish, lotion, cream, changed skin tone (e.g., tan, sunburn, tattoo, jaundice, alternative skin coloring), a bandage or wound dressing, a mask (e.g., nose and mouth mask, a CPAP mask) or any other article that at least partially obscures the face depicted in image 110. In some examples, the face depicted may or may not be wearing eyewear. Comparison unit 214 may be configured to receive personal characteristic data relating to the one or more temporary facial obstructions of a previously identified person, e.g., from electronic database 122 such as a prescription for a CPAP mask or lotion or cream, a record of treatment for a scar, abrasion, sore, cut, sunburn, conditions including jaundice as a symptom, and the like. Comparison unit 214 and/or facial recognition unit 216 may be configured to determine the one or more temporary facial conditions and/or obstructions for comparison with the received personal characteristic data.

For example, comparison unit 214 and/or facial recognition unit 216 may be configured to determine the face depicted in image 110 includes a CPAP mask and a forehead bandage, and may receive personal characteristic data of a previously identified person indicating a sleep apnea diagnosis and a record of a treatment for a forehead cut. In some example, the CPAP mask and bandage may obscure and/or prevent convention facial recognition, however, comparison unit 214 may be configured to increase a score (as described below) indicative of a match between the person depicted in image 110 and the previously identified person based on the comparison of the personal characteristic data, and may be configured to identify, and/or authenticate the identity of, the person depicted in image 110 based on comparison with the personal characteristic data.

Comparison unit 214 may be further configured to determine a score indicative of a match between the person wearing the eyewear in image 110 and the previously identified person based on the comparison including the corrected facial feature. For example, comparison unit 214 may be configured to determine the score based on a proportion of characteristic and/or parameter matches between the person wearing the eyewear in image 110 and the previously identified person. As an illustrative example, comparison unit 214 may determine that 8 out of 10 parameters/characteristics such as angles, distortions, measurements, optical parameters, facial features, and the like, are a match, and the score may then be "8." In some examples, comparison unit 214 may be configured to separately score portions of image 110 including eyewear from other portions of image 110. In some examples, comparison unit 214 may determine the score based on the separately scored portions of image 110 including eyewear, the other portions of image 110, or both in any suitable combination.

In some examples, identification unit 209, comparison unit 214 and/or facial recognition unit 216 may be configured to authenticate, based on the score determined by comparison unit 214, an identity of the person wearing the eyewear in image 110 as the previously identified person, e.g., the identity of which may be attributable to the personal characteristic data from electronic database 122. In some examples, identification unit 209, comparison unit 214 and/or facial recognition unit 216 may be further configured to provide access to a resource to the person wearing the eyewear based on the authentication.

For example, a resource may include a mobile device such as a smartphone, laptop, computing device, an area, room, or volume of space with access controlled by a security device such as a door lock, and the like, may use facial recognition to identify a person attempting to access the device and/or pass a security check of the security device. Facial recognition may use known facial features of the person stored in electronic database 122 that are associated with and/or attributable to the person as previously identified and/or verified. The person may be wearing eyewear such as described herein which may interfere with facial recognition attempting to authenticate the person based on an image 110 depicting the person wearing the eyewear, and the person may not be able to access the device or pass the security check. Identification unit 209, comparison unit 214 and/or facial recognition unit 216 may be configured to authenticate the identity of the person wearing the eyewear, and then provide access to a resource to the person, via the systems and techniques described herein, e.g., by determining an optical parameter of a lens of the eyewear and authenticating the person based on a match between the optical parameter and a personal characteristic of a previously identified person rather than authenticating the person based on facial recognition. In some examples, identification unit 209, comparison unit 214 and/or facial recognition unit 216 may be configured to improve facial recognition, e.g., by correcting a facial feature of the person distorted by the eyewear. In some examples, identification unit 209, comparison unit 214 and/or facial recognition unit 216 may be configured to authenticate the person depicted in image 110, and provide access to a resource to the person depicted in image 110, via facial recognition including the corrected feature(s) and the score based on a match between the optical parameter and a personal characteristic of a previously identified person in any combination.

In some examples, identification unit 209 may be configured to determine the identity of the person wearing eyewear depicted in image 110 from a plurality of people. For example, comparison unit 214 may be configured to determine a score based on determining a plurality of matches of varying degrees based on a plurality of comparisons between the optical parameter and a plurality of personal characteristic data of a plurality of previously identified people received from electronic database 122. In other words, the optical parameter may improve a search of electronic database 122 to match to the person depicted in image 110, e.g., by using an optical parameter and/or corrected facial features in addition to, or in lieu of, using facial features and facial recognition.

As another example, comparison unit 214 may be configured to determine a score of a plurality of people depicted in image 110, where one or more of the people depicted are wearing eyewear. For example, optical parameter unit 210 may be configured to determine a plurality of sets of one or more optical parameters, each of the sets of optical parameters associated with a person wearing eyewear depicted in image 110, according to the systems and techniques described herein. Image conditioning unit 212 may be configured to apply and/or cause image capture device to use one or more filters 118 to reduce and/or correct a plurality of oversaturation regions 1040, each of the plurality of oversaturation regions associated with respective eyewear of respective people depicted in image 110, according to the systems and techniques described herein. Identification unit 209, comparison unit 214 and/or facial recognition unit 216 may be configured to compare each set of optical parameters to personal characteristic data of one or more previously identified people from electronic database 122, and determine one or more scores, each indicative of a match between a person wearing eyewear depicted in image 110 and a previously identified person from electronic database 122, according to the systems and techniques described herein. Identification unit 209, comparison unit 214 and/or facial recognition unit 216 may be configured to identify, and/or provide access to a resource to, one or more persons wearing eyewear depicted in image 110, e.g., from one or more other persons depicted in image 110 and/or previously identified and received from electronic database 122.

Figure 8B:
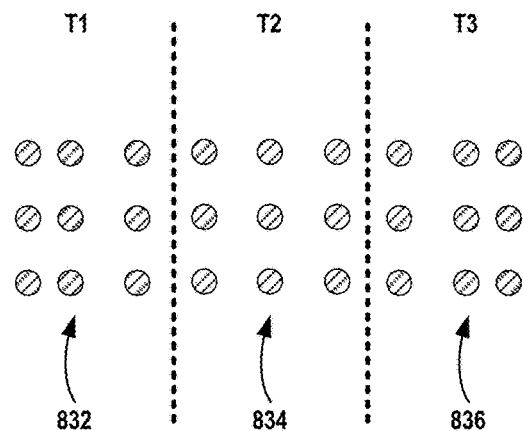
FIG. 8B is a conceptual diagram illustrating an example plurality of reflection patterns comprising the reflection pattern of FIG. 8A.
Figure 9B:
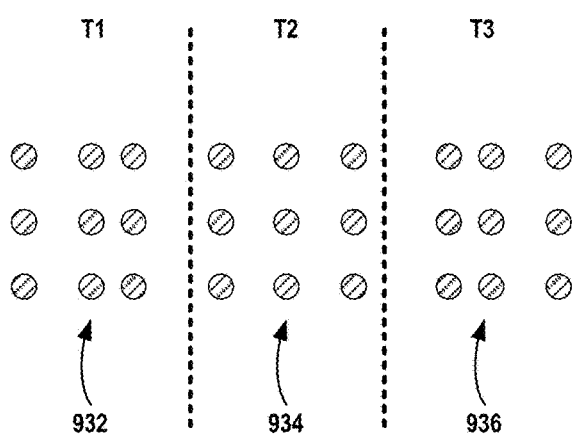
FIG. 9B is a conceptual diagram illustrating an example plurality of reflection patterns comprising the reflection pattern of FIG. 9A.

FIGS. 8A-9B illustrate an example of determining an optical parameter of an eyewear lens based on a plurality of reflection patterns from a plurality of images, e.g., a sequence of images. FIG. 8A is a conceptual diagram illustrating an example image 810 depicting a face of a person wearing eyewear and showing a reflection pattern 830 including reflected laser dots generated by a lens of the eyewear having a convex front surface, in accordance with one or more aspects of this disclosure. FIG. 8B is a conceptual diagram illustrating an example plurality of reflection patterns 832-836 comprising reflection pattern 830 of FIG. 8A. FIG. 9A is a conceptual diagram illustrating an example image 910 depicting a face of a person wearing eyewear and showing a reflection pattern 930 including reflected laser dots generated by a lens of the eyewear having a concave front surface, in accordance with one or more aspects of this disclosure. FIG. 9B is a conceptual diagram illustrating an example plurality of reflection patterns 932-936 comprising reflection pattern 930 of FIG. 9A. Images 810 and 910 may be examples of image 110 described herein. FIGS. 8A-9B may be examples of mapping an optical distortion field, e.g., a distortion in a reflection pattern 830 and/or 930 of the projected light by the lens due to an optical parameter of the lens, e.g., a shape of a surface of the lens, a structure/roughness of a surface of the lens, indices of refraction of a material of the lens, birefringence of a material of the lens, neutral and/or wavelength-dependent transmission, absorption, and/or reflection of the lens, an optical activity of the lens, an absorbing or reflective polarizing surface or material of the lens, and the like.

In the examples shown, images 810 and 910 may comprise a sequence of images captured at times T1, T2, and T3. Projection device 114 may be configured to project light and to move the projected light relative to the lens between each image of the sequence of images. For example, projection device 114 may include an array of lasers configured to project laser light (e.g., substantially collimated or "specular light") of one or more wavelengths onto the lens and arranged to be moved and/or rotated, e.g., raster scanning via a stepper motor. Alternatively, camera 112 may capture each image of the sequence of images while image capture device 104 is moving relative to the person wearing the eyewear depicted in each image, e.g., one or both of image capture device 104 and the person wearing the eyewear are moving, effectively shifting the projected light to different positions between each image of the sequence of images. In the examples shown, each image of the image sequence 810 includes a shifted reflection pattern 832, 834, or 836, and each image of the image sequence 910 includes a shifted reflection pattern 932, 934, or 936.

Optical parameter unit 210 may be configured to determine an optical parameter based on one or more of the images of image sequences 810 and 910, e.g., based on one or more of shifted reflection patterns 832-836 or 932-936. In some examples, shifted reflection patterns 832-836 or 932-936 are alternative ways to obtain an increased number of features in images 810 or 910 relative to the features projected by projecting structured light onto the lens, e.g., a way to increase the number of dots and/or area of the surface of the lens reflecting dots without increasing the number of dots projected and/or the area over which the dots are projected. The examples of FIGS. 8A and 8B illustrate a convex surface optical parameter indicated by compression of the reflected dots relative to projected dots at least in the horizontal direction (e.g., a convex cylindrical surface with a vertical cylindrical axis). The examples of FIGS. 9A and 9B illustrate a concave surface optical parameter indicated by compression of the reflected dots relative to projected dots at least in the horizontal direction (e.g., a concave cylindrical surface with a vertical cylindrical axis).

In the examples of FIGS. 8A-9B, reflection patterns 830 and 930 may be obtained via time variation of the projected light, e.g., capturing a sequence of reflection patterns while the position of the project light is changed between each image. In some examples, system 100 may be configured to determine an optical parameter by obtaining an optical distortion field, e.g., via capturing/obtaining multiple reflection patterns of the lens via time variation of other attributes of the projected and/or reflected light alternatively from or in addition to position. Image captured device 104 may be configured to raster scan the projected light as described above while changing one or more other attributes of the projected light and capture the resulting reflection pattern corresponding to each changed attribute. For example, image capture device 104 may be configured to raster scan a laser array to project a light pattern of a first wavelength across the lens at a plurality of positions for a first amount of time and capture a first sequence of images each including a reflection pattern corresponding to the varied positions of the projected light. Image capture device 104 may be configured to then raster scan a laser array to project a light pattern of a second wavelength across the lens at the plurality of positions for a second amount of time and capture a second sequence of images each including a reflection pattern corresponding to the varied positions of the projected light. In addition to first and second wavelengths of the projected light, image capture device 104 may be configured to raster scan a laser array to project a light pattern of first and second polarizations for first and second amounts of time while capturing first and second sequences of images each including a reflection pattern corresponding to the varied positions of the projected light. Further, image capture device 104 may be configured to raster scan a laser array to project a light pattern while using different, or no, filters with camera 112. For example, a first IR notch filter may be used for a first raster scan and sequence of images, and a second UV notch filter may be used for a second raster scan and sequence of images. In this way, a large data set may be formed including information within a plurality of reflection patterns or changes to reflection patterns from which optical parameter unit 210 may be configured to determine one or more optical parameters of the lens.

For example, image capture device 104 may be configured to raster scan a red laser array to project a red dot pattern on the lens for the first 50 ms while capturing an image including a reflection pattern corresponding to each position of the raster scan. Image capture device 104 may then scan a blue laser array for the next 50 ms while capturing images, and then scan a laser array having a first vertical polarization for the next 50 ms while capturing image, and then scan a laser array having a second horizontal polarization of the next 50 ms while capturing images, and then scan a laser array for the next 50 ms while using an IR notch filter while capturing images, and then scan a laser array for the next 50 ms while using an UV notch filter while capturing images.

Figure 12:
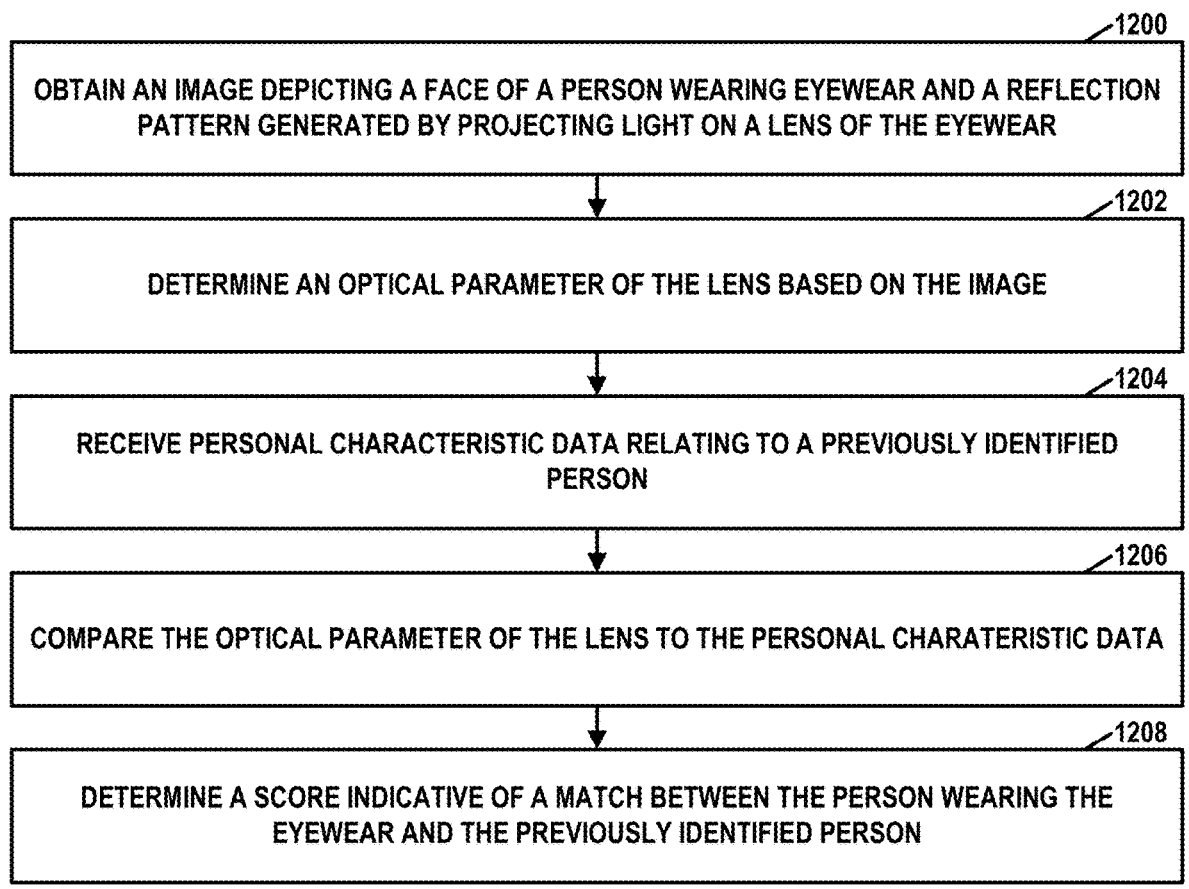
FIG. 12 is a flowchart illustrating an example operation of an identification application, in accordance with one or more aspects of this disclosure.

FIG. 12 is a flowchart illustrating an example operation of an identification unit 209, in accordance with one or more aspects of this disclosure. The figures of the disclosure are provided as examples. In other examples, operations of identification unit 209 may include more, fewer, or different actions. The flowchart of this disclosure is described with respect to the other figures of this disclosure. However, the flowchart of this disclosure are not so limited. For ease of explanation, the flowchart of this disclosure is described with respect to system 100 and computing device 102, but the flowchart of this disclosure may be applicable mutatis mutandis with respect to privacy aspects of system 100.

In the example of FIG. 12, identification unit 209 may obtain image 110 depicting a face of a person wearing eyewear and a reflection pattern 130 generated by projecting light onto a lens of the eyewear (1200). For example, identification unit 209 may receive image 110 from image database 124 and/or image capture device 104. In some examples, reflection pattern 130 may be indicative of the optical parameter. The optical parameter may include at least one of a surface shape, an index of refraction, an optical power, an eyewear prescription, a surface coating, a lens cut, an optical transmissivity, a photochromism, a tint, a birefringence, or a retardance. In some examples, image 110 may include a plurality of images and/or a sequence of images and reflection pattern 130 may include a plurality of reflection images, as described elsewhere in this disclosure. In some examples, the projected light comprises a structured light pattern. In some examples, reflection pattern 130 includes one or more reflection patterns generated by any or all of a front surface of the lens, a rear surface of the lens, an optical interface internal to the lens, a skin surface of the person wearing the eyewear, or a front corneal surface of the person wearing the eyewear.

In some examples, image conditioning unit 212 may be configured to determine that image 110 includes an oversaturation region, e.g., oversaturation region 1040, and cause image capture device 104 to apply a filter 118 to image 110 to correct/reduce oversaturation region 1040, or to apply a filter such as a bandpass and/or notch filter 118 while capturing a subsequent image 110.

Furthermore, in the example of FIG. 12, identification unit 209 may determine an optical parameter of the lens based on image 110 (1202). As described elsewhere in this disclosure, optical parameter unit 210 may determine an optical parameter based on reflection pattern 130. In some examples, identification unit 209 may determine an optical parameter of the lens by determining one or more indices of refraction of the lens based on one or more reflection patterns of 130 and/or one or more reflection patterns 130, each of which may include a plurality of reflection patterns, as elsewhere described herein. In some examples, identification unit 209 may determine an optical parameter of the lens by determining one or more materials of the lens based on the determined indices of refraction.

In some examples, identification unit 209 may determine an optical parameter of the lens by determining a surface shape of the lens based on reflection pattern 130 and determining an eyewear prescription of the lens based on the determined surface shape. In some examples, identification unit 209 may determine an optical parameter of the lens by determining a birefringence and/or a retardance of the lens based on reflection pattern 130, and determining an eyewear specification of the lens based on the determined birefringence and/or retardance. In some examples, identification unit 209 may determine an optical parameter of the lens by determining a transmissivity of the lens based on reflection pattern 130, and determining a photochromism, material, tint, and/or eyewear specification of the lens based on the determined transmissivity. In some examples, identification unit 209 may determine an optical parameter of the lens based on a filtered image 110, e.g., a subsequent image 110 imaged while utilizing a filter 118, as described above.

Furthermore, in the example of FIG. 12, identification unit 209 may receive personal characteristic data relating to a previously identified person (1204). In some examples, identification unit 209 may receive the personal characteristic data from electronic database 122.

Identification unit 209 may compare the optical parameter of the lens to the personal characteristic data (1206), and determine a score indicative of a match between the person wearing eyewear and the previously identified person (1208). For example, identification unit may determine the score indicative of a match between an eyewear prescription and/or eyewear specification optical parameter and an eyewear prescription and/or eyewear specification personal characteristic data.

In some examples, identification unit 209 may correct one or more facial features of the depiction of the face in the image distorted by the eyewear based on the optical parameter of the lens. Identification unit 209 may then compare the corrected facial feature to the personal characteristic, e.g., a pupil distance, and determine the score based on a comparison of the corrected facial feature.

In some examples, identification unit 209 may authenticate an identity of the person wearing the eyewear as the identified person relating to the received personal characteristic data and provide access to a resource to the person wearing the eyewear based on the authentication.

In some examples, identification unit 209 may be configured to determine the identity of one or more people wearing eyewear in image 110 from a plurality of identified people, e.g., either previously identified people from electronic database 122 or people identified by facial recognition (e.g., people not wearing eyewear within image 110 and identified via facial recognition).

The following is a non-limiting list of examples that are in accordance with one or more techniques of this disclosure.

Example 1: A method including: obtaining, by processing circuitry, an image depicting a face of a person wearing eyewear and a reflection pattern generated by projecting light onto a lens of the eyewear; determining, by the processing circuitry, an optical parameter of the lens based on the image; receiving, by the processing circuitry and from an electronic database, a personal characteristic data relating to a previously identified person; comparing, by the processing circuitry, the optical parameter of the lens to the personal characteristic data; and determining, by the processing circuitry and based on the comparison, a score indicative of a match between the person wearing eyewear and the previously identified person.

Example 2: The method of example 1, wherein the reflection pattern generated by projecting the light onto the lens of the eyewear is indicative of the optical parameter of the lens.

Example 3: The method of example 1 or example 2, wherein the optical parameter comprises at least one of a surface shape, an index of refraction, an optical power, an eyewear prescription, a surface coating, a lens cut, an optical transmissivity, a photochromism, a tint, a birefringence, or a retardance.

Example 4: The method of any one of examples 1 through 3, wherein: the light is a first structured light pattern at a first wavelength, the reflection pattern is a first reflection pattern and is generated by projecting the first structured light pattern onto the lens, the image or a second image depicts the face of the person wearing the eyewear and a second reflection pattern generated by projecting a second structured light pattern at a second wavelength onto the lens, the optical parameter of the lens is a material of the lens, and determining the optical parameter comprises: determining indices of refraction of the lens based on the first reflection pattern and the second reflection pattern; and determining the material of the lens based on the indices of refraction of the lens.

Example 5: The method of any one of examples 1 through 4, wherein: the optical parameter is an eyewear prescription, the light is a structured light pattern, the reflection pattern is a reflection pattern generated by projecting the structured light pattern onto the lens, and determining the optical parameter comprises: determining a surface shape of the lens based on the reflection pattern; and determining the eyewear prescription based on the determined surface shape of the lens.

Example 6: The method of any one of examples 1 through 5, wherein: the reflection pattern is a first reflection pattern from a first surface, the image depicts a second reflection pattern resulting from reflection from a second surface, the first surface comprises a front surface of the lens, the second surface comprises at least one of a rear lens surface of the lens, an optical interface internal to the lens, a skin surface of the person wearing the eyewear, or a front corneal surface of the person wearing the eyewear, and determining the optical parameter comprises determining the optical parameter based on the first and second reflection patterns.

Example 7: The method of example 6, wherein: the reflection pattern is a first reflection pattern, the light is a first structured light pattern having a first polarization state, the method further comprises obtaining, by the processing circuitry, a second image depicting the face of the person wearing the eyewear and a second reflection pattern generated by projecting a second structured light pattern having a second polarization state onto the lens of the eyewear, the optical parameter of the lens is at least one of a birefringence or a retardance of the lens, determining the optical parameter of the lens comprises determining the optical parameter of the lens based on the first reflection pattern and the second reflection pattern.

Example 8: The method of any one of examples 1 through 7, wherein: the light has a diffuse and broadband light pattern, wherein the light is projected onto the lens of the eyewear with a predetermined intensity for a predetermined amount of time configured to cause a photochromic response of the lens, the reflection pattern is a first reflection pattern, the method further comprises obtaining, by the processing circuitry, a second image depicting the face of the person wearing the eyewear and a second reflection pattern generated by projecting light onto the lens of the eyewear after the predetermined amount of time, wherein determining the optical parameter of the lens comprises: determining a transmissivity of the lens based on the first reflection pattern and the second reflection pattern; and determining a photochromism of the lens based on the transmissivity of the lens.

Example 9: The method of any one of examples 1 through 8, further including: correcting, via the processing circuitry and based on the optical parameter of the lens, a facial feature of the face of the person depicted in the image distorted by the eyewear; and comparing, by the processing circuitry, the corrected facial feature to the personal characteristic data, wherein determining the score is based on at least one of the comparison of the optical parameter of the lens to the personal characteristic data or the corrected facial feature to the personal characteristic data.

Example 10: The method of any one of examples 1 through 9, wherein the personal characteristic data comprises at least one of an eyewear prescription, an eyewear specification, a pupil distance, an eyewear boundary, or a facial feature.

Example 11: The method of any one of examples 1 through 10 further including: determining, by the processing circuitry, that the image includes an oversaturation region; and obtaining, by the processing circuitry, a subsequent image depicting the face of the person wearing eyewear and a subsequent reflection pattern generated by projecting light onto the lens of the eyewear captured using a notch filter, wherein the optical parameter is determined based on the subsequent image.

Example 12: The method of any one of examples 1 through 11, further including authenticating, based on the score, an identity of the person wearing the eyewear as the previously identified person; and providing access to a resource to the person wearing the eyewear based on the authentication.

Example 13: The method of any one of examples 1 through 12, wherein receiving the personal characteristic data relating to an previously identified person comprises receiving a personal characteristic data from each of a plurality of previously identified persons, the method further includes determining, based on the score, an identity of the person wearing the eyewear from the plurality of previously identified persons.

Example 14: A computing system including: an image capture device configured to obtain an image depicting a face of a person wearing eyewear and a reflection pattern generated by projecting light onto a lens of the eyewear; and one or more processors implemented in circuitry and in communication with a storage device, the one or more processors configured to: receive, from the image capture device, the image depicting a face of a person wearing eyewear, wherein the image includes structured light projected onto at least a lens of the eyewear; determine an optical parameter of the lens based on the image; receive, from an electronic database, a personal characteristic data relating to a previously identified person; compare the optical parameter of the lens to the personal characteristic data; and determine, based on the comparison, a score indicative of a match between the person wearing eyewear and the previously identified person.

Example 15: The computing system of example 14, wherein the image capture device is configured to project the structured light, wherein the structured light is indicative of the optical parameter of the lens, wherein the optical parameter comprises at least one of a surface shape, an index of refraction, an optical power, an eyewear prescription, a surface coating, a lens cut, an optical transmissivity, a photochromism, a tint, a birefringence, or a retardance.

Example 16: The computing system of example 15, wherein: the reflection pattern is a first reflection pattern from a first surface, the image depicts a second reflection pattern resulting from reflection from a second surface, the first surface comprises a front surface of the lens, the second surface comprises at least one of a rear lens surface of the lens, an optical interface internal to the lens, a skin surface of the person wearing the eyewear, or a front corneal surface of the person wearing the eyewear, and determining the optical parameter comprises determining the optical parameter based on the first and second reflection patterns.

Example 17: The computing system of any one of examples 14 through 16, wherein the personal characteristic data comprises at least one of an eyewear prescription or an eyewear specification.

Example 18: The computing system of any one of examples 14 through 17, wherein the image capture device comprises a notch filter configured to filter an oversaturation region generated by the eyewear such that the oversaturation region does not oversaturate the image.

Example 19: The computing system of any one of examples 14 through 18, wherein: the light has a diffuse and broadband light pattern, wherein the light is projected onto the lens of the eyewear with a predetermined intensity for a predetermined amount of time configured to cause a photochromic response of the lens, the reflection pattern is a first reflection pattern, the one or more processors are further configured to: obtain a second image depicting the face of the person wearing the eyewear and a second reflection pattern generated by projecting light onto the lens of the eyewear after the predetermined amount of time; determine a transmissivity of the lens based on the first reflection pattern and the second reflection pattern; and determine a photochromism of the lens based on the transmissivity of the lens.

Example 20: A non-transitory computer-readable medium having instructions stored thereon that, when executed, cause one or more processors to: receive at least one image depicting a face of a person wearing eyewear, wherein the image includes structured light projected onto at least a lens of the eyewear; determine an optical parameter of the lens based on the image; receive, from an electronic database, a personal characteristic data relating to a previously identified person; compare the optical parameter of the lens to the personal characteristic data; and determine, based on the comparison, a score indicative of a match between the person wearing eyewear and the previously identified person.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

Further, certain operations, techniques, features, and/or functions may be described herein as being performed by specific components, devices, and/or modules. In other examples, such operations, techniques, features, and/or functions may be performed by different components, devices, or modules. Accordingly, some operations, techniques, features, and/or functions that may be described herein as being attributed to one or more components, devices, or modules may, in other examples, be attributed to other components, devices, and/or modules, even if not specifically described herein in such a manner.

In one or more examples, the functions described may be implemented in hardware, software, firmware, or any combination thereof. If implemented in software, the functions may be stored on or transmitted over a computer-readable medium as one or more instructions or code and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers, processing circuitry, or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM, or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), and Blu-ray disc, where disks usually reproduce data magnetically, while discs reproduce data optically with lasers. Combinations of the above should also be included within the scope of computer-readable media.

Instructions may be executed by processing circuitry (e.g., one or more processors, such as one or more DSPs, general purpose microprocessors, ASICs, FPGAs, or other equivalent integrated or discrete logic circuitry), as well as any combination of such components. Accordingly, the term "processor" or "processing circuitry" as used herein, may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless communication device or wireless handset, a microprocessor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

What is claimed is:

1. A method comprising:
   obtaining, by processing circuitry, one or more images depicting a face of a person wearing eyewear, a first reflection pattern generated by projecting a first structured light pattern onto a lens of the eyewear at a first wavelength, and a second reflection pattern generated by projecting a second structured light pattern onto the lens at a second wavelength;
   determining, by the processing circuitry, indices of refraction of the lens based on the first reflection pattern and the second reflection pattern;
   determining, by the processing circuitry, one or more optical parameters of the lens based at least on the one or more images, wherein determining the one or more optical parameters comprises determining a material of the lens based on the indices of refraction of the lens;
   receiving, by the processing circuitry and from an electronic database, a personal characteristic data relating to a previously identified person;
   comparing, by the processing circuitry, the one or more optical parameters of the lens to the personal characteristic data; and
   determining, by the processing circuitry and based on the comparison, a score indicative of a match between the person wearing eyewear and the previously identified person.

2. The method of claim 1, wherein the first reflection pattern and second reflection pattern are generated by projecting the first structured light pattern and the second structured light pattern onto the lens of the eyewear is indicative of the one or more optical parameters of the lens.

3. The method of claim 1, wherein the one or more optical parameters further comprise at least one of a surface shape, an index of refraction, an optical power, an eyewear prescription, a surface coating, a lens cut, an optical transmissivity, a photochromism, a tint, a birefringence, or a retardance.

4. The method of claim 1, wherein:
   the one or more optical parameters further comprise an eyewear prescription, and
   determining the one or more optical parameters further comprises:
     determining a surface shape of the lens based on the first reflection pattern; and
     determining the eyewear prescription based on the determined surface shape of the lens.

5. The method of claim 1, wherein:
   the first reflection pattern is from a first surface,
   the one or more images depicts a third reflection pattern resulting from reflection from a second surface,
   the first surface comprises a front surface of the lens,
   the second surface comprises at least one of a rear lens surface of the lens, an optical interface internal to the lens, a skin surface of the person wearing the eyewear, or a front corneal surface of the person wearing the eyewear, and
   determining the one or more optical parameters comprises determining at least one of the one or more optical parameters based on the first and third reflection patterns.

6. The method of claim 5, wherein:
   the first structured light pattern comprises a first polarization state,
   the second structured light pattern comprises a second polarization state, and
   the one or more optical parameters of the lens further include at least one of a birefringence or a retardance of the lens.

7. The method of claim 1, wherein:
   the first structured light pattern comprises a diffuse and broadband light pattern, wherein the diffuse and broadband light pattern is projected onto the lens of the eyewear with a predetermined intensity for a predetermined amount of time configured to cause a photochromic response of the lens,
   the method further comprises obtaining, by the processing circuitry, a subsequent image depicting the face of the person wearing the eyewear and a third reflection pattern generated by projecting light onto the lens of the eyewear after the predetermined amount of time,
   wherein determining the one or more optical parameters of the lens comprises:
     determining a transmissivity of the lens based on the first reflection pattern and the third reflection pattern; and
     determining a photochromism of the lens based on the transmissivity of the lens.

8. The method of claim 1, further comprising:
   correcting, via the processing circuitry and based on the one or more optical parameters of the lens, a facial feature of the face of the person depicted in the one or more images distorted by the eyewear; and
   comparing, by the processing circuitry, the corrected facial feature to the personal characteristic data,
   wherein determining the score comprises determining the score based on the comparison of the one or more optical parameters of the lens to the personal characteristic data and the corrected facial feature to the personal characteristic data.

9. The method of claim 1, wherein the personal characteristic data comprises at least one of an eyewear prescription, an eyewear specification, a pupil distance, an eyewear boundary, or a facial feature.

10. A method comprising:
obtaining, by processing circuitry, a first image depicting a face of a person wearing eyewear and a reflection pattern generated by projecting first light onto a lens of the eyewear;
determining, by the processing circuitry, that the first image includes an oversaturation region;
obtaining, by the processing circuitry, a subsequent image depicting the face of the person wearing eyewear and a subsequent reflection pattern generated by projecting second light onto the lens of the eyewear captured using a notch filter;
determining, by the processing circuitry, an optical parameter of the lens based on the first image and the subsequent image;
receiving, by the processing circuitry and from an electronic database, a personal characteristic data relating to a previously identified person;
comparing, by the processing circuitry, the optical parameter of the lens to the personal characteristic data; and
determining, by the processing circuitry and based on the comparison, a score indicative of a match between the person wearing eyewear and the previously identified person.

11. The method of claim 1, further comprising:
authenticating, based on the score, an identity of the person wearing the eyewear as the previously identified person; and
providing access to a resource to the person wearing the eyewear based on the authentication.

12. The method of claim 1, wherein receiving the personal characteristic data relating to the previously identified person comprises receiving a personal characteristic data from each of a plurality of previously identified persons, the method further comprising:
determining, based on the score, an identity of the person wearing the eyewear from the plurality of previously identified persons.

13. A computing system comprising:
one or more processors implemented in circuitry and in communication with a storage device, the one or more processors configured to:
receive, from an image capture device, a first image depicting a face of a person wearing eyewear and a first reflection pattern generated by projecting a first structured light pattern onto a lens of the eyewear with a predetermined intensity for predetermined amount of time configured to cause a photochromic response of the lens, wherein the first structured light pattern comprises a diffuse and broadband light pattern;
receive, from the image capture device, a second image depicting the face of the person wearing the eyewear and a second reflection pattern generated by projecting a second structured light pattern onto the lens of the eyewear after the predetermined amount of time;
determine one or more optical parameters of the lens based on the first image and the second image, wherein at least one of:
the one or more optical parameters comprise a transmissivity of the lens and the one or more processors are configured to determine the transmissivity of the lens based on the first reflection pattern and the second reflection pattern, or
the one or more optical parameters comprise a photochromism of the lens and the one or more processors are configured to determine the photochromism of the lens based on the transmissivity of the lens;
receive, from an electronic database, a personal characteristic data relating to a previously identified person;
compare the one or more optical parameters of the lens to the personal characteristic data; and
determine, based on the comparison, a score indicative of a match between the person wearing eyewear and the previously identified person.

14. The computing system of claim 13, wherein the second structured light pattern is indicative of the one or more optical parameters of the lens, wherein the one or more optical parameters of the lens further comprise at least one of a surface shape, an index of refraction, an optical power, an eyewear prescription, a surface coating, a lens cut, a tint, a birefringence, or a retardance.

15. The computing system of claim 14, wherein:
the second reflection pattern is from a first surface,
the second image depicts a third reflection pattern resulting from reflection from a second surface,
the first surface comprises a front surface of the lens,
the second surface comprises at least one of a rear lens surface of the lens, an optical interface internal to the lens, a skin surface of the person wearing the eyewear, or a front corneal surface of the person wearing the eyewear, and
determining the one or more optical parameters comprises determining at least one of the one or more optical parameters based on the second and third reflection patterns.

16. The computing system of claim 13, wherein the personal characteristic data comprises at least one of an eyewear prescription or an eyewear specification.

17. The computing system of claim 13, wherein the image capture device comprises a notch filter configured to filter an oversaturation region generated by the eyewear such that the oversaturation region does not oversaturate the first image or the second image.

* * * * *